Dec. 6, 1960     E. K. KAPRELIAN     2,962,932
GAS DISCHARGE LIGHT SHUTTER

Filed May 13, 1958

Edward K. Kaprelian
INVENTOR.

2,962,932
GAS DISCHARGE LIGHT SHUTTER

Edward K. Kaprelian, 29 Riveredge Road, Red Bank, N.J.

Filed May 13, 1958, Ser. No. 734,928

2 Claims. (Cl. 88—61)

This invention relates to a light control cell and is directed particularly to a cell employing the phenomena of absorption spectra.

It has been observed that the luminous area of a gaseous discharge or metal vapor discharge lamp will absorb light of many different wavelengths, over a fairly broad spectrum. Some wavelengths are substantially completely absorbed, while others are transmitted to some small degree through the discharge. If such a gaseous of metal vapor discharge is placed between a detector and a source of light, the radiation received by the detector will comprise essentially only those wavelengths emitted by the discharge itself.

The present invention utilizes such a discharge in combination with a light filter which absorbs completely the radiation from the discharge while allowing substantial transmission of other wavelengths of light from the light source or from an illuminated object. The successive and complementary absorbing actions of the filter and of the gaseous discharge layer acts in combination to block the transmission of light. When the gaseous discharge layer is deenergized, light of those wavelengths to which the filter is transparent, i.e., wavelengths other than those present in the gaseous discharge, is transmitted. By briefly deenergizing the gaseous discharge, as for example through the use of pulsing circuits commonly employed in electronic devices or by means of mechanical switch devices, a light shutter results which is suitable for photography, signalling, and similar purposes. The gaseous discharge can also be pulsed for the purpose of recording sound or other signals on light sensitive surfaces.

The object of this invention is to provide a light control device having no moving parts.

Another object is to provide a shutter of high speed and large area.

Still another object is to provide a light cell capable of modulation at high frequencies.

Still other objects and applications will become apparent from the specification and drawing in which.

Figure 1:
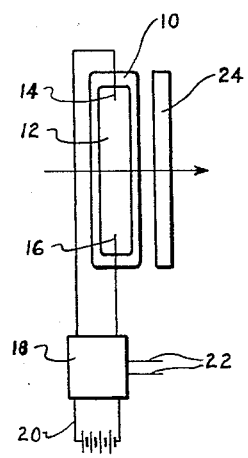
Fig. 1 shows diagrammatically the elements of the invention.

As shown in Fig. 1 the light control device comprises a gaseous discharge cell 10, power and control means 20 and 18, and filter 24. Cell 10 includes an inner, sealed-off cavity 12 containing a suitable gas or metal vapor. A pair of electrodes 14 and 16 are sealed off within the cell and are electrically connected through a control box 18 containing a switch or pulsing device to a battery or power source 20. Conductors 22 lead to an operating switch, not shown, which initiates the action of the control box. Filter 24 which may comprise (1) one or more layers of selectively absorbing dyes, preferably in the form of gelatin filters, (2) interference filter layers, or (3) both dye and interference filters, is held close to and coextensive with cell 10, the latter being positioned between the filter and the light source or illuminated object. In order to reach the film or other sensor, light from the source or object must pass first through the cell and then through the filter.

In operation, the light control device is maintained in closed, or non light transmitting condition by applying a steady source of direct current from source 20 to the electrodes 14 and 16. The resulting steady discharge prevents the passage of light of most wavelengths through cell 20; those wavelengths which are transmitted are absorbed by filter 24 which also absorbs those wavelengths emitted by the discharge. Depending upon the size of the cell, the electrode spacing and configuration, the specific gas or metal vapor employed and the pressure within the cell, voltages ranging from 400 to 12,000 or higher may be required. In some instances a high striking voltage of 8,000 to 20,000 volts is required momentarily for starting, subsequent operating voltages of one tenth this range being employed. To operate the light control device as a shutter the source of voltage is briefly interrupted by the switch or pulsing circuit and again restored.

If the invention is employed as a modulator, for example in connection with sound recording or light telephony, the desired signal, at appropriate voltage, is applied to electrodes 14 and 16. Obviously, the light source being modulated need not be one emitting a continuous spectrum as does a tungsten lamp. Gaseous discharge lamps are suitable as the light source for both modulation and some photographic applications, provided the spectral characteristics of the gas discharge light source and the gas discharge cell are so chosen that a practical proportion of the light emitted by the source is transmitted by the filter.

Figure 2:
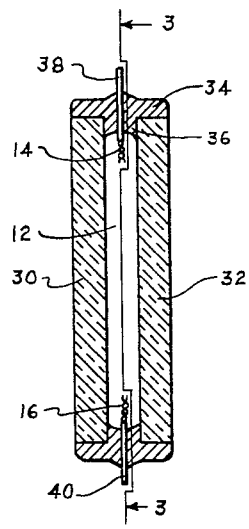
Fig. 2 shows in side elevational cross section a gaseous discharge cell along line 2—2 of Fig. 2.
Figure 3:
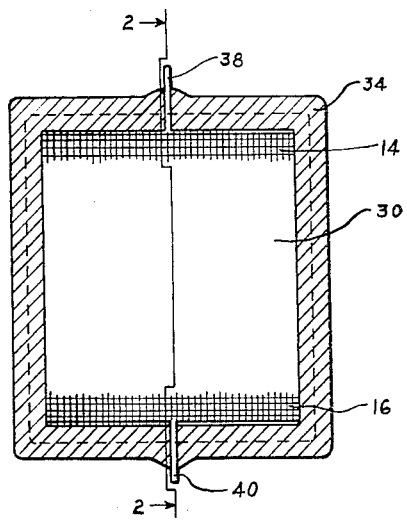
Fig. 3 shows in front elevational cross section the same cell along line 3—3 of Fig. 2.

Figs. 2 and 3 show a simple form of gaseous discharge cell in which the gas or vapor chamber 12 contains electrodes 14 and 16 at either end. The electrodes extend substantially completely across each end of the chamber and are preferably constructed in the form of a screen as shown. The chamber is formed by a pair of glass windows 30 and 32 sealed to a body member 34, also preferably of glass. An inner flange 36 formed from the body member acts as a spacer and supports the edges of the plates. The quality of the glass plates and their optical finish can be made to match the requirements of the particular application. Leads 38 and 40 attach to the electrodes and are connected to the voltage source and exposure control means.

The electrodes need not be disposed at opposite ends of the gas discharge cell as shown but may take the form of a transparent electrically conducting coating on the inner surface of each window, with appropriate connecting leads through the body member. In this case the electrical discharge will take place in a direction generally parallel to the direction of light passage instead of transversely as in Figs. 2 and 3.

Obviously, also, the filter 24 could be made part of one or both of windows 30 and 32, if desired, in order to reduce the number of glass-air surfaces in the light controller. In initially selecting the filter-gaseous discharge combination it is important to utilize those gases or metals which emit principally in those wavelengths which are multiples of some desirable wavelength. The multiple layer interference filter is then designed so as to absorb these emitted wavelengths. By careful selection and combination of interference filters and dye filters a practical match can be made to the spectra of beryllium, boron, helium, lithium and neon. Other filter arrangements are possible, as for example by diffraction grating techniques, which will permit the use of still other elements in the gaseous discharge.

I claim:

1. A light controlling shutter for controlling the passage of a portion of the light spectrum, comprising an active gaseous discharge cell for absorbing a first group of wavelengths of light of said portion of the spectrum, a light filter for absorbing a second group of wavelengths of light, said second group constituting the remaining wavelengths of light in said portion of the spectrum, said filter permitting transmission therethrough of said first group of wavelengths, and means for momentarily inactivating said gaseous discharge cell to allow the passage therethrough of light of said first group of wavelengths.

2. A light controlling shutter comprising a sealed electrical discharge cell containing an electrical discharge responsive light emitting gas and provided with an entrance window for receiving the light to be controlled and an exit window parallel to and spaced apart from said entrance window for allowing the passage of light out of said cell, a source of electrical potential, electrode means within said cell connected to said source of electrical potential for producing a gaseous discharge in the space between said windows, said discharge responsive gas emitting light of given wavelengths and absorbing light of other given wavelengths, a light filter at said exit window for selectively absorbing light of the wavelengths emitted during said discharge and simultaneously transmitting light of other wavelengths, and electrical switching means at said source of electrical potential for momentarily interrupting said gaseous discharge to permit the passage of light of the wavelengths absorbed by said discharge and for immediately thereafter restoring said gaseous discharge to block the passage of light.

References Cited in the file of this patent
UNITED STATES PATENTS

| | | |
|---|---|---|
| 1,894,042 | Jenkins | Jan. 10, 1933 |
| 2,158,968 | Moffat | May 16, 1939 |
| 2,216,220 | Baker | Oct. 1, 1940 |
| 2,382,939 | Koch | Aug. 14, 1945 |
| 2,413,940 | Bickford | Jan. 7, 1947 |
| 2,774,903 | Burns | Dec. 18, 1956 |
| 2,820,918 | Aronstein | Jan. 21, 1958 |